United States Patent [19]
Akins

[11] Patent Number: 6,149,001
[45] Date of Patent: *Nov. 21, 2000

[54] COVER FOR A LAPTOP OR NOTEBOOK COMPUTER

[75] Inventor: Anthony F. Akins, Playa Del Rey, Calif.

[73] Assignee: A. F. Akins, Inc., Carson City, Nev.

[ * ] Notice: Under 35 U.S.C. 154(b), the term of this patent shall be extended for 539 days.

[21] Appl. No.: 08/559,156

[22] Filed: Nov. 17, 1995

[51] Int. Cl.[7] .................................................. B65D 85/00
[52] U.S. Cl. ........................... 206/320; 206/576; 150/165
[58] Field of Search .................................... 150/165, 154; 206/320, 720, 721, 701, 305, 576; 190/109, 107, 900, 901; 364/708.1

[56] References Cited

U.S. PATENT DOCUMENTS

| | | |
|---|---|---|
| D. 265,561 | 7/1982 | Cottrell . |
| D. 319,218 | 8/1991 | Sakaguchi et al. . |
| D. 322,430 | 12/1991 | Kline et al. . |
| D. 323,929 | 2/1992 | Hodson . |
| D. 349,277 | 8/1994 | Merino et al. . |
| D. 349,893 | 8/1994 | Bennett . |
| 4,898,009 | 2/1990 | Lakoski et al. . |
| 4,932,524 | 6/1990 | Hodson . |
| 5,025,921 | 6/1991 | Gasparaitis et al. ..................... 206/320 |
| 5,163,560 | 11/1992 | Parrish, Jr. et al. ..................... 206/320 |
| 5,163,870 | 11/1992 | Cooper . |
| 5,283,862 | 2/1994 | Lund . |
| 5,346,122 | 9/1994 | Leader et al. ............................ 206/701 |
| 5,400,903 | 3/1995 | Cooley . |

FOREIGN PATENT DOCUMENTS 2533896 10/1982 France .................................. 206/305

OTHER PUBLICATIONS

Information Label—Silicon Sports, Inc. "Portable Computer Wetsuit Carrying Case", 1994.
Information Tag—Silicon Sports, Inc. "Wetsuit 2.0", Notebook Wetsuit.

*Primary Examiner*—Paul T. Sewell
*Assistant Examiner*—Nhan T. Lam
*Attorney, Agent, or Firm*—Lyon & Lyon LLP

[57] ABSTRACT

A cover for a portable computer is a thin flexible material adapted to fit closely over the computer like a glove. The cover has cut-outs for the keyboard, screen, controls, ports, etc. of the computer so that the cover does not interfere with convenient use of the computer. The cover is compact and adds little additional volume or weight to the computer, while protecting the computer housing or case, providing an attractive appearance and also providing convenient accessories, such as pockets for a power supply cord, floppy disks, CD ROM disks, pencils, etc. The computer may be carried or used with the cover installed.

7 Claims, 6 Drawing Sheets

6,149,001

COVER FOR A LAPTOP OR NOTEBOOK COMPUTER

BACKGROUND OF THE INVENTION

As technology has developed, computers have become more powerful, yet also more compact and lightweight. Various notebook or laptop computers are widely available, from manufacturers including, for example, Compaq, IBM, Apple, NEC, Toshiba, etc. These computers generally have a base section containing a keyboard, disk drives, power supply, and other components. A screen or upper section is generally attached to the base section by a hinge, so that the upper section can be pivoted upwardly during use. The upper section typically includes the screen, speakers, and occasionally other controls or components. When the computer is not in use, the screen is folded flat against the base, forming a compact package. The screen section is held closed by a latch. The upper and lower sections or housings are often made of hard plastic, to offer some level of protection against impact, spilled liquids, and other adverse environmental conditions. However, the hard plastic case or housings are themselves subject to abuse, such as chipping, scratching, etc.

To protect the entire computer, including the hard plastic housings, various computer cases have been used. These known cases generally zip open to receive the computer with cloth or foam padding on some or all sides. Often, such computer cases have handles or carrying straps. While these types of cases have been successfully used, they have certain disadvantages. For example, the case must be zipped open and the computer removed before it can be used. Power and peripheral cables generally must be disconnected before placing the computer in the case, and then reconnected before use. In addition, the case offers no protection to the computer, when the computer is not in the case. Moreover, such computer cases are generally bulky and can be relatively heavy (in relation to the computer itself). Accordingly, there is a need for an improved cover or case for portable computers. Other and further objects will appear hereinafter.

SUMMARY OF THE INVENTION

To these ends, a cover for a portable computer of the type having a screen or upper section pivotally connected to a base section, preferably includes a base cover section made of a thin and flexible material, with the base cover section having top and rear walls joined with a bottom and left and right side walls. A flap extends from the rear wall. The base cover section advantageously has a plurality of openings adapted to align over components of the computer, when the base cover section is installed over the base of the portable computer.

An upper or screen cover section, in a preferred embodiment, has front and rear walls joined by left and right side walls and a top wall, and having an open bottom. Elastic flaps advantageously extend from the front wall. The upper cover section envelops or slides over the upper or screen section of the computer and is secured into place by the flaps stretching and wrapping around the hinge between the base and upper sections of the computer, with a Velcro pad on the flaps attaching to a mating pad on the back wall of the upper cover section. The base and upper cover sections preferably are made of thin leather or vinyl. A hard or flexible transparent screen forms part of the front wall of the upper cover section and aligns with the screen of the computer, when the upper cover section is installed. Similarly, access to other components, connectors or controls of the computer is preferably provided by openings in the base and upper cover sections.

BRIEF DESCRIPTION OF THE DRAWINGS

In the drawings, wherein similar elements denote similar reference characters throughout the several views.

DETAILED DESCRIPTION OF THE PREFERRED EMBODIMENT

Figure 1:
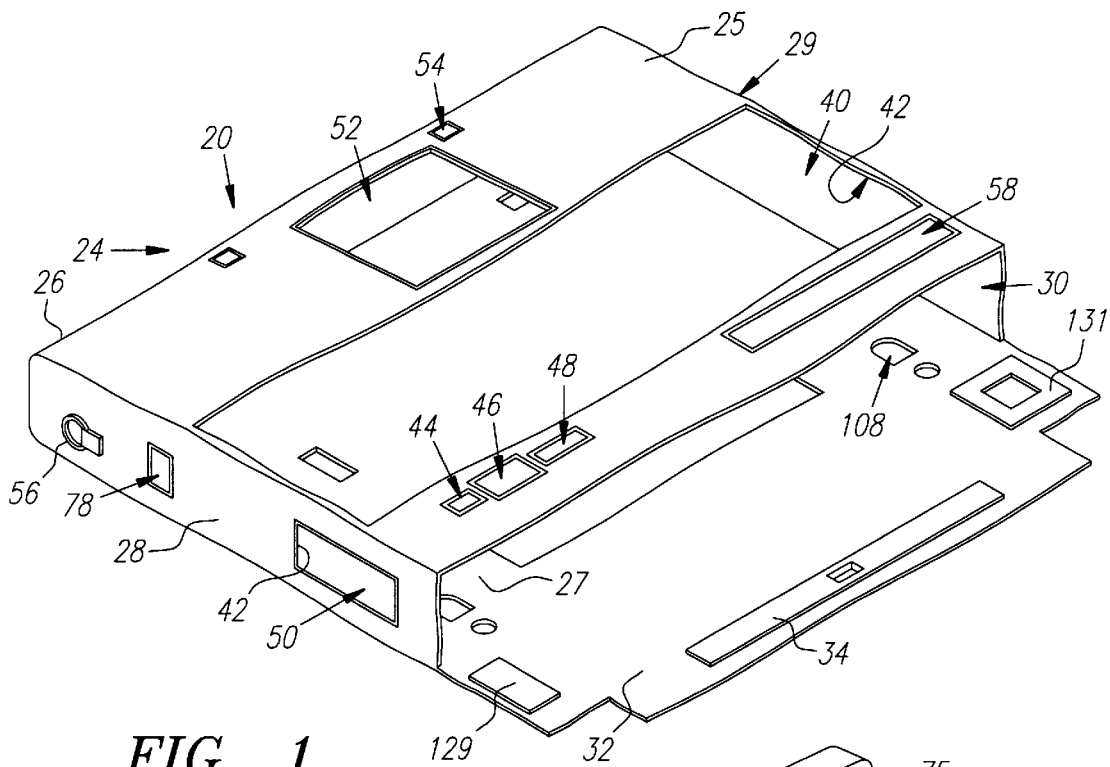
FIG. 1 is a perspective view of the base cover section of the present cover for a portable computer.
Figure 2:
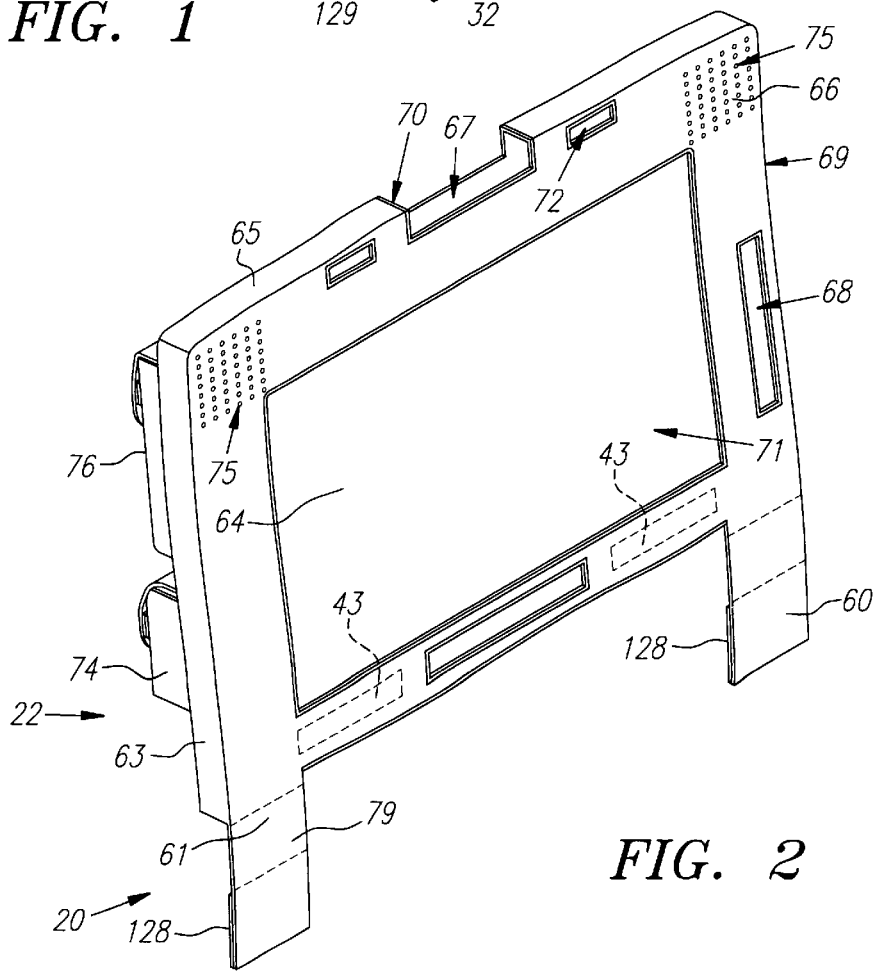
FIG. 2 is a perspective view of the present upper cover section.

Turning now in detail to the drawings, as shown in FIGS. 1 and 2, a cover for a portable computer includes a top cover section 22 and a base cover section 24. The top section 22 and base section 24 are preferably made of a thin and flexible material, such as vinyl or leather, preferably less than about 3/16 of an inch thick. The base section includes a top wall 25, base end wall 26, a rear wall 27, right side wall 28 and a left side wall 29, preferably continuously joined together to provide glove-like structural integrity and a neat and attractive appearance. Of course, depending on the material of manufacture, at certain locations the walls may need to be joined by stitching, adhesives, etc. The top wall 25, rear wall 27 and right and left side walls 28 and 29, form a generally rectangular opening 30 adapted to slide over the base section of a computer. A flap 32 extends from the rear wall 27 and includes a Velcro fastener 34.

Referring still to FIG. 1, the base section 24 of the cover 20 has cut-outs or openings to provide access to components, controls or indicators on the computer. The openings are cut out of the material of the cover 20 at specific locations, so that they will appropriately align with their respective computer component (for example, connectors, indicators, controls, etc.). A border 42 is provided around each of the cut-outs e.g., by sewing or embroidering to resist tearing or fraying of the cover material and to provide an attractive appearance. As shown in FIGS. 1 and 2, in a cover 20 adapted to fit on, for example, an NEC Versa 4000 series computer, the cut-outs or openings provided are: a keyboard opening 40, a power switch opening 46, an LCD panel sensor opening 44, power management button 48, an audio ports opening 50, a glide pad mouse opening 52, latch openings 54, a computer lock opening 78, and an LCD panel display opening 58. Other openings may also be provided.

Turning to FIG. 2, the upper cover section 22 similarly has a front wall 61 joined to rear wall 67 by a top wall 65 and left and right side walls 63 and 69, also in a substantially continuous generally five sided envelope. Hinge tabs 60 extend below the front wall 61. The hinge tabs 60 are elastic 79 with Velcro hook fastener material attached to the elastic and adapted to engage onto Velcro loop fastener material on the rear surface of the rear wall 67. As with the base cover 24, the upper cover section 22 has cut-outs or openings for various components. Specifically, as shown in FIG. 2 a large cut-out 71 is provided to align with the screen of the computer. A flexible or rigid transparent window 64 is attached over the screen cut-out 71, to protect the screen of the computer. Alternatively, the screen cut-out 71 may be left open. Other openings include the brightness control opening 68, the latch openings 72 and speaker holes 66. A latch notch opening 70 is provided at the top center of the upper cover section 22. An accessory pouch 74 and disk storage 76 may be provided on the rear wall 67 of the upper cover section 22.

Figure 3:
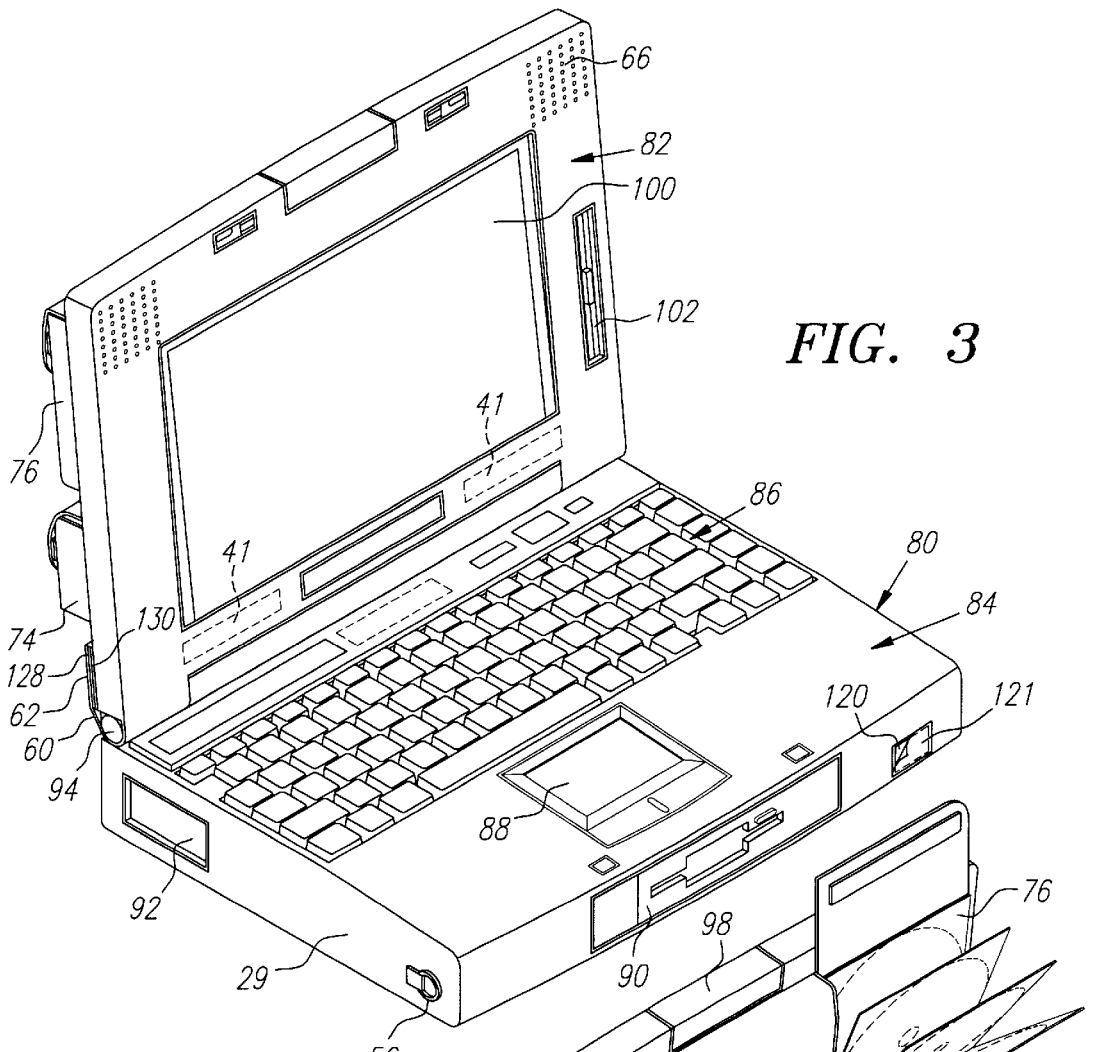
FIG. 3 is a perspective view of the cover sections of FIGS. 1 and 2 installed over a portable computer.
Figure 4:
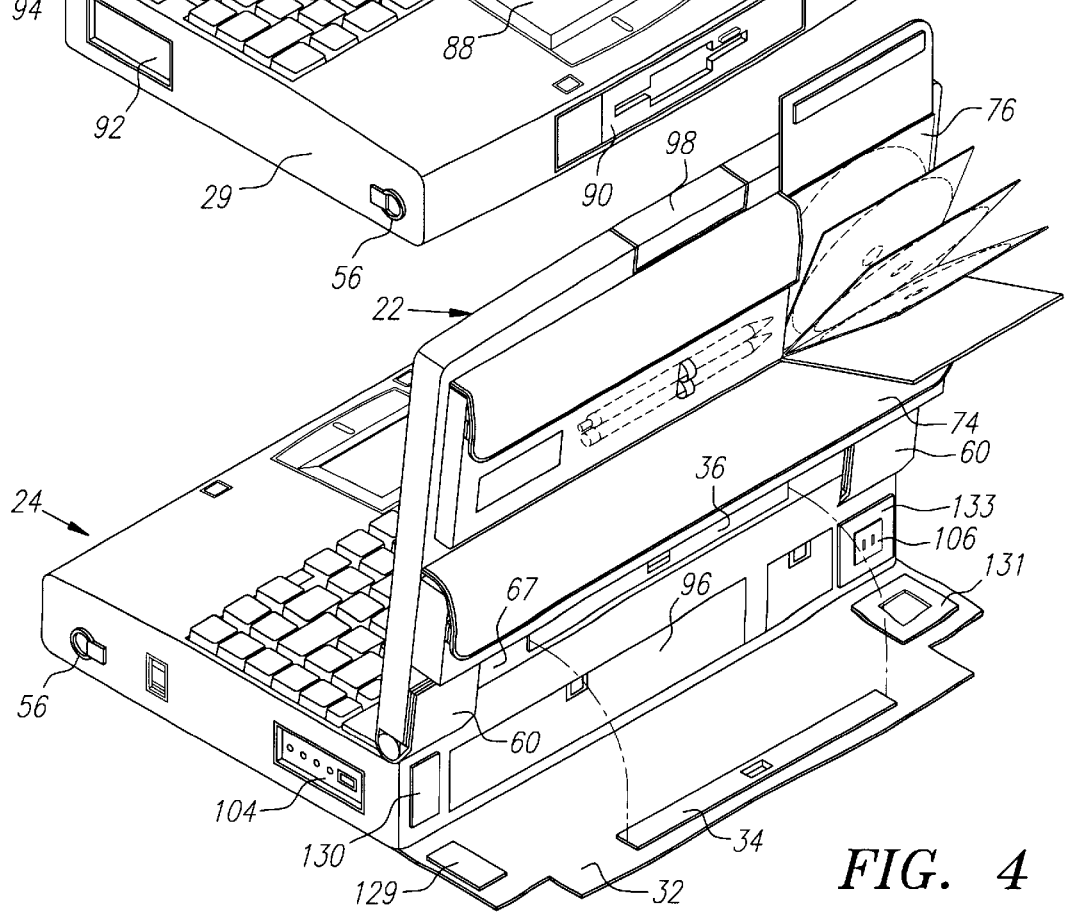
FIG. 4 is a rear perspective view thereof.
Figure 5:
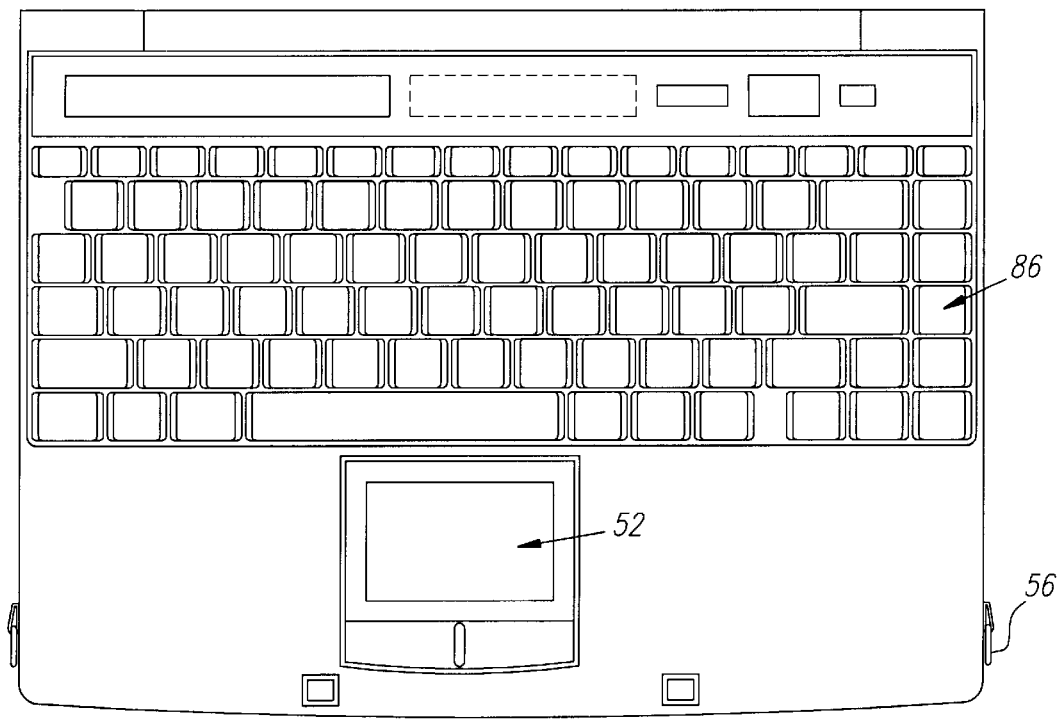
FIG. 5 is a plan view thereof.

Turning to FIGS. 3, 4 and 5, a portable computer 80 has an upper section 82 attached to a base section 84 by a hinge 94. The computer 80 has a keyboard 86, glide pad mouse 88, removable floppy disk drive 90, PC cards 92 and connector access doors 96. The base cover section 22, as shown in FIG. 1, is slid over the base section 84 of the computer 80. The base cover section 24 is specifically sized and dimensioned to fit over the computer base section 84, like a tight fitting glove. With the base cover section 24 slipped entirely over the base section 84 of the computer, the various cut-outs or openings shown in FIG. 1 align with the corresponding components of the base section 84 of the computer as shown in FIG. 3.

Referring to FIGS. 3 and 4, the upper or screen section 82 of the computer 80 has a latch handle 98, a screen 100, a brightness control 102 and speakers 66. The upper cover section 22 is pulled over the upper section 82 of the computer, also like a glove, and the various cut-outs or openings, align over their corresponding components. The elastic tabs 60 are brought under and around the hinge 94 stretching the elastic of the tabs 60 and are secured to the back wall of the top cover section 22 using Velcro attachment strips e.g., 128 and 62. Alternatively, other fasteners may be used. The upper cover section 22 is accordingly secured into place over the upper section 82 of the computer 80. Referring to FIGS. 3 and 4, to secure the base cover section 24, the flap 32 is pivoted upwardly so that the Velcro fastener 34 mates with a corresponding Velcro fastener 36 on the rear wall 67 of the lower cover section 24. Simultaneously, Velcro attachments 129 and 130 engage each other at the outer rear sides of the base cover section 24, and Velcro attachments 34 and 36 engage each other in the center. As shown in FIGS. 2 and 3, to better secure the upper cover section 22 around the screen, preferably Velcro loop strips 41 are adhered to the upper section 82 of the computer below the screen and engage Velcro hook strips 43 on the inside of the upper cover section.

Figure 6:
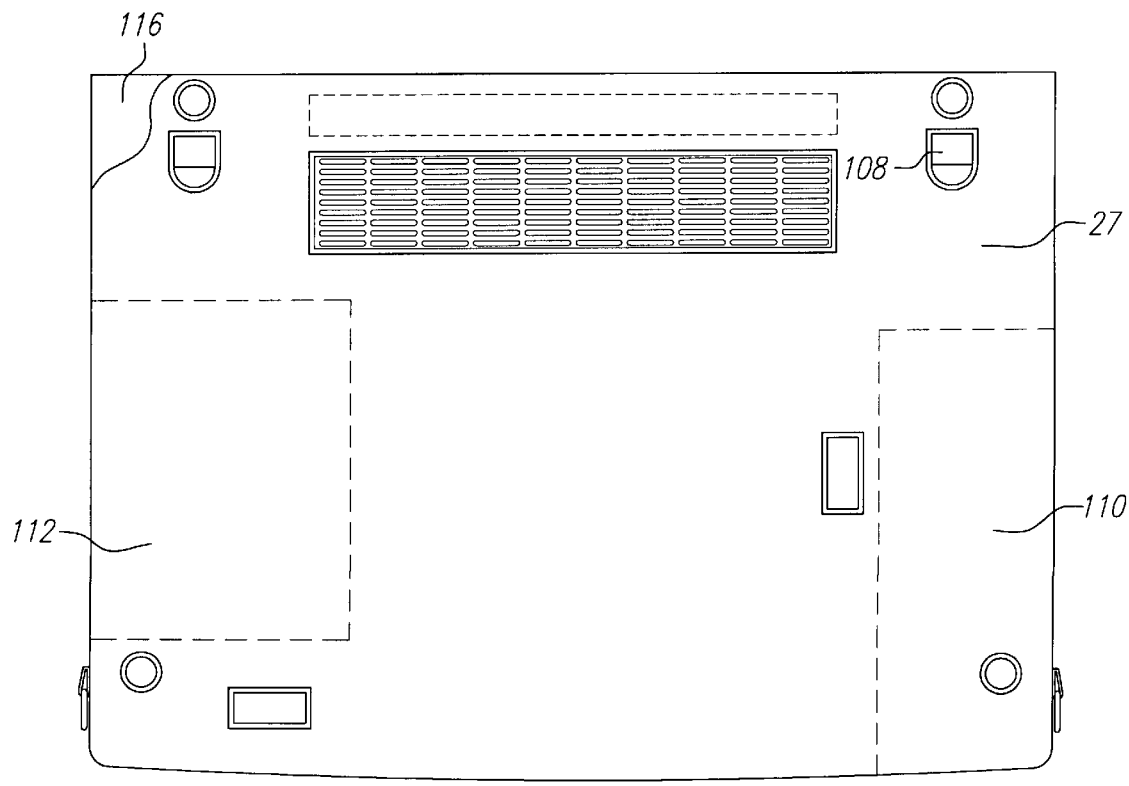
FIG. 6 is a bottom view thereof, in part broken away to show a padding under the cover material.

Referring to FIG. 6, small openings 108 may be provided for adjustable feet. In the computer shown, the bottom surface has relatively large covers for the battery bay 110 and the hard disk drive 112 which are covered over the cover 20, as they are not usually accessed frequently. If these bays need not be accessed frequently, no cut-out or opening in the cover 20 is required, and the battery bay 110 and hard disk drive bay 112 are covered and concealed by the rear wall of the base cover section 24. Alternatively, if these bays (or any other bay or component of the computer) must be readily accessible for convenience of the user, openings may be provided for them, or openings with small flap covers 121, as shown in FIG. 3 (over an infrared light port 120) may be used. The flap covers can be securely closed with Velcro or snaps.

Figure 7:
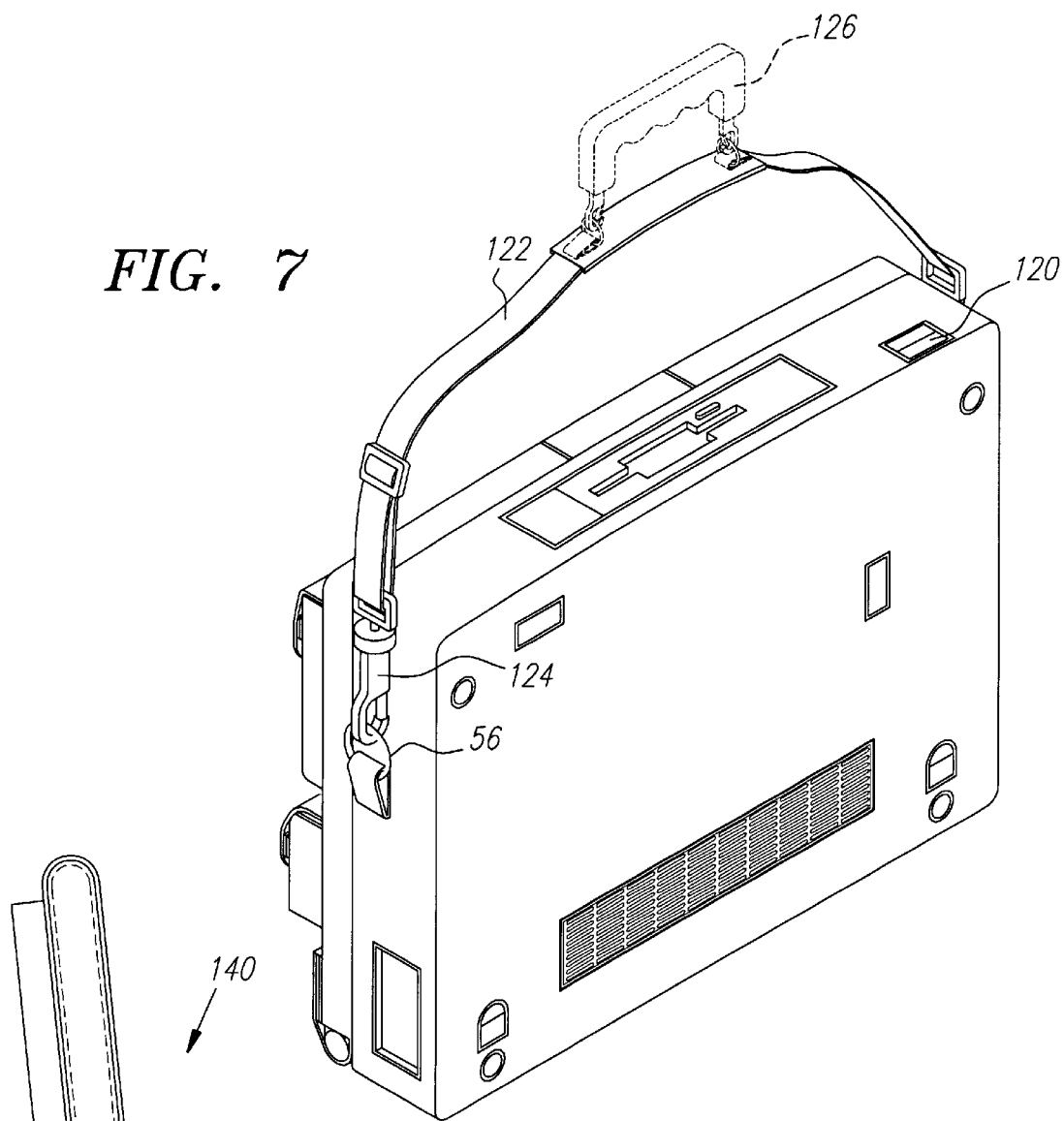
FIG. 7 is a bottom perspective view of the present cover including a carrying strap and removable handle.

As shown in FIG. 7, eye rings 56 are preferably provided on the left and right side walls of the base cover section 24. A carrying strap 122 can be attached to the eye rings 56 by clips 124. A removable handle 126 may be provided with the carrying strap 122. The Velcro attachments 131, 34 and 129 and their mating pieces 133, 36 and 130 (which are adhered to the back of the lower section of the computer), are made large to securely contain the lower section of the computer, when it is carried as shown in FIG. 7.

Figure 11:
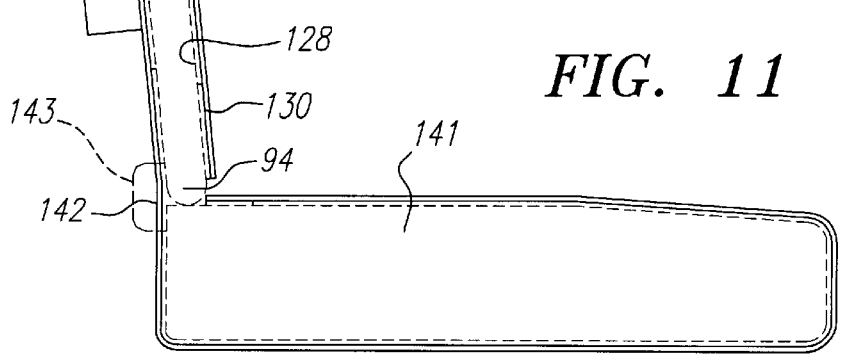
FIG. 11 is a side elevation view of a one-piece embodiment.
Figure 8:
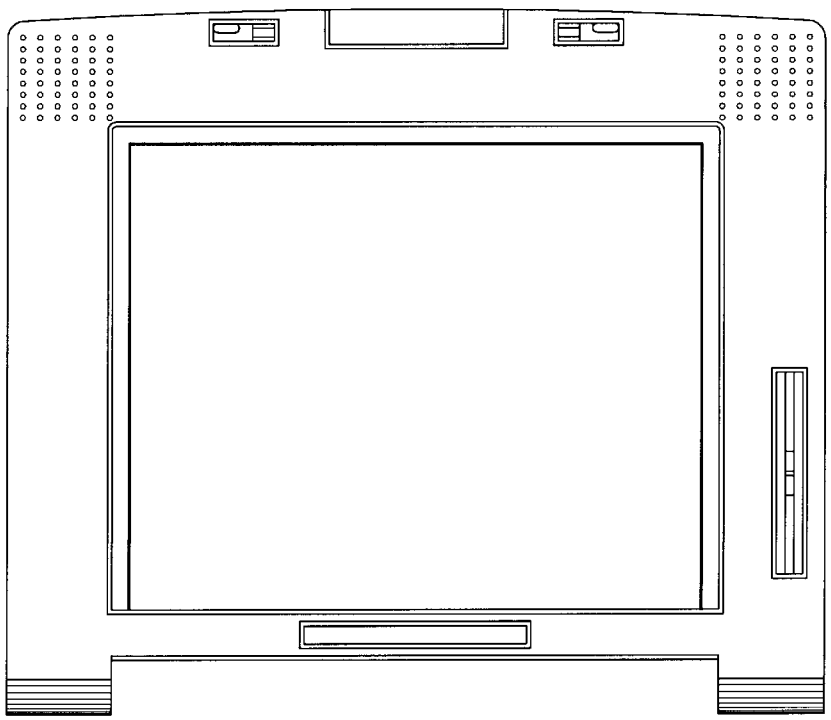
FIG. 8 is a partial front elevation view of the upper cover section installed on a computer.
Figure 9:
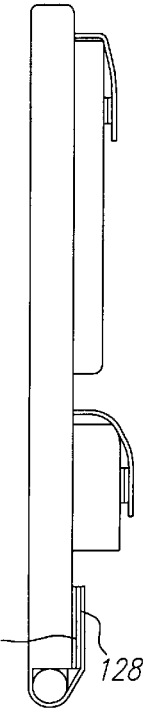
FIG. 9 is a side elevation view thereof.
Figure 10:
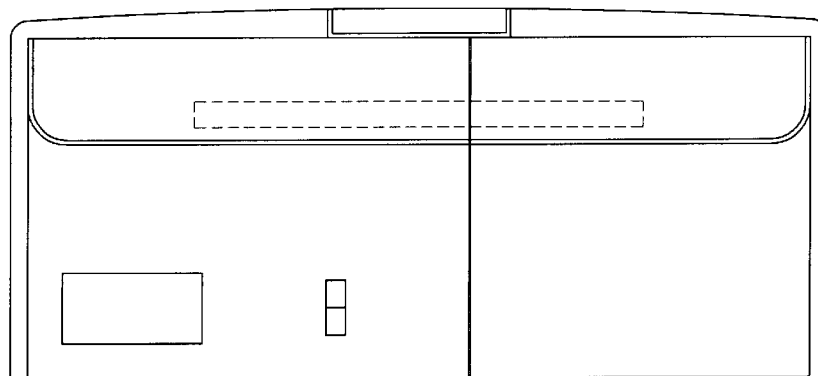
FIG. 10 is a rear elevation view thereof.
Figure 12:
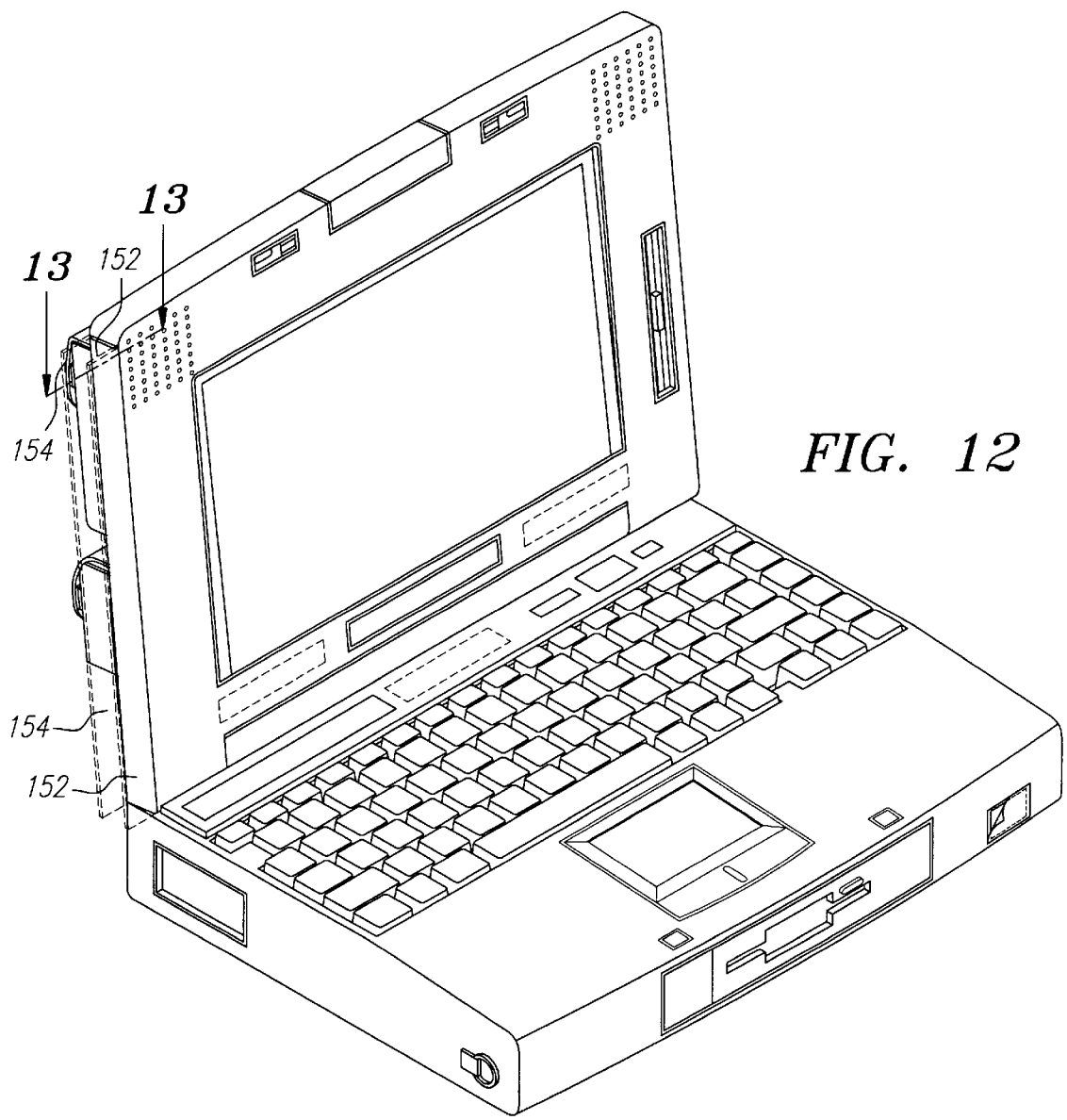
FIG. 12 is a perspective view thereof.
Figure 13:
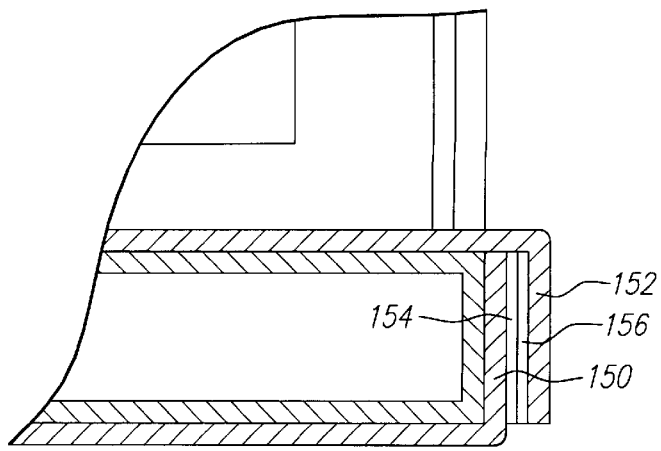
FIG. 13 is a partial section view taken along line 13—13 of FIG. 12.

A one-piece embodiment 140 is shown in FIG. 11. For a computer 141 with insufficient clearance space around the hinge for the tabs 60 to pass through, the one-piece cover 140 may be used. The cover 140 is similar to the cover 20, except the upper and base cover sections are joined at or over the hinge. The material 142 at the hinge flexes as the upper or screen section of the computer 141 is opened and closed. Alternatively, the material 142 may be replaced by an elastic or other flex strip, hinge, bellows 143 or equivalent pivotable member. The cover 140 is installed by sliding the lower cover section over the base of the computer 141, and then wrapping the upper cover section over the upper or screen section, as shown in FIGS. 12 and 13, and fastening it on with Velcro fasteners. The rear side flaps 150 on each side are folded against the computer, and then the front side flaps 152 are folded over the rear side flaps 150 and are held in place with a Velcro attachment 154 on the outside of the rear side flaps 150 engaging a Velcro attachment 156 on the inside of the front side flap 152.

The cover 20 or 140 fits snugly over the computer 80 or 141, preferably without significant wrinkles or stretching. The cover 20 or 140 protects the case of the computer against scratching and also provides an attractive accessory and carrying feature while not interfering with convenient use of the computer 80 or 141. As will be appreciated by those skilled in the art, the cover material may be patterned and die cut so that the cover 20 or 140 will properly fit onto the computer 80 or 141. The dimensions, contours, and cut-out locations of the cover will of course change depending upon the size, shape and configuration of the computer on which the cover is used. Accordingly, the invention contemplates a variety of covers, each one adapted to fit onto a specific computer.

As shown in FIG. 6, for some additional protection, a thin layer of foam, fiber, cloth or other material 116 may be provided on inside surfaces of the cover especially on the inside of the rear wall of the base cover section 24 (which is at the bottom of the computer, when in use). Such padding or shock absorbing material may also be added at other locations.

The covers 20 or 140 may be manufactured to fit various computers. Table 1 below lists computers that the covers may be made for.

TABLE 1

| MAKE | MODEL |
| --- | --- |
| AST | |
| Ascentia | 800N |
| | 810N |
| | 900N |
| | 950N |
| ACER | 760Cx |

TABLE 1-continued

| MAKE | MODEL |
|---|---|
| | 780C |
| | 780Cx |
| AMBRA | |
| N Series | N-75 |
| S N Series | N-100 |
| APPLE | 520 |
| | 520C |
| | 540C |
| AT&T | 0250 |
| | Globalyst 200 |
| BROTHER | |
| CANON | |
| Innova | 150C |
| | 200LS |
| COMPAQ | |
| Contura | 410C |
| | 410Cx |
| | 420C |
| | 430C |
| Contura Aero | 4/33C |
| | 433 |
| LTE Elite | 4/75Cx |
| | 340 |
| | 510 |
| | LTE Elite |
| LTE | 5000 |
| DELL | Latitude LX4100D |
| | XPIP75D, XPIP90D |
| | XPIP90ST, XT |
| | M, MC, MCX |
| | XP |
| | 4100, 4100Cx |
| DIGITAL | |
| HiNote Ultra | |
| EPSON | ActionNote 660, 866, 880 |
| | 880Cx, 890C, 890Cx, 910 |
| | 880C |
| ERGO | Power Brick 90, 486 Dz |
| | CD-Brick Pentium 120 |
| | Pentium 100 |
| FUTUREMATE | FM 5475, FM5575 |
| | FM 309, FM 5400, FM |
| | FM559, 5500 |
| GATEWAY 2000 | Colorbook, Nomad, 40, Handbook |
| | Liberty |
| HEWLETT PACKARD | Omnibook 4000C |
| | HP-5000 CT, 5000CTS |
| | 600C, 600CT |
| | 1000CT, 1000 CX, 200LX |
| IBM | ThinkPad 355C, |
| | 360CE, 360CS, |
| | 500, 510C, 510CS, |
| | 701, 701C Butterfly, |
| | 701CS, 755, 755C, 755 CD, |
| | 755 CE, 755 CSE, 755 CX, 760 C |
| LEADING EDGE | Aviva |
| MOTOROLA | Power Books: 060 Series, 190/66 |
| | 53 00CE/117 |
| | Power PC 603E |
| MITSUBA | Ninja |
| MID WEST MICRO | Elite, Elite Soundbook, |
| | Elite Soundbook Plus, Elite |
| | Soundbook II |
| NEC | Versa 2000D, Versa M, |
| | Versa P, Versa V |
| NOVACOM | 400 |
| OMNIBOOK | 660C, 4000CT |
| POWER CD | 8500 |
| PRO STAR | 8200, 9200 |
| SAMSUNG | Sens 700 Notebook |
| SHARP | PC 3010 |
| | PC 8650, PC 8660, PC8700, |
| | PC8800, PC8900 |
| SLIM NOTE 6 | 10C, 15T |
| SLIM NOTE 5 | 75C, 75T, 10C, 10T |
| SOUND PRO | |
| TEXAS INSTRUMENTS | Travelmate: 4000E, 4000M, 5000, |
| | 5100 |
| | Extensa: 450 |
| | TI: 450, 550, 550 CD, 5000, 450 CT |
| TOSHIBA | Satellite Pro: T2155 CDS, T1900, |
| | T2400, T4700C, 4800CT, T4850CT |
| | Tecra Series: 700CT, T2100, |
| | T2110, T2130, T2150, T2155, |
| | T2105, T1900, T4500, T4600, |
| | T4700, T4800, T4850, T4900, |
| | T3400, T3600, T610, T400, TI 910, |
| | TI 910CS, TI 960CS, TI 960CT, |
| | T2100CS, T2150CDS, T 3600CT, |
| | 2110CS |
| TWIN HEAD | Slim Note 8 |
| | 875 Cx, 875 Tx |
| | 890 Cx, 890 Tx |
| UNIVERSA P 100 | Universa CD |
| VIRAGE | –II |
| | –3 |
| | –3CD |
| WIN BOOK | 3 Series |
| | –XPC |
| | –XP |
| | –XPS |
| ZENITH | ZNote-Flex |
| | ZNote-Flex P |
| | Z-Star |
| ZEOS | Meridian 850C |
| ALTIMA SYSTEMS ACOM | Virage II, Virage 3D |
| | Patriot 4000F, Patriot 8000 |
| AMS DIRECT | SoundPro, Sound Pro P-54 |
| ARM COMPUTER | ArmNote T530 |
| | ArmNote T570CD |
| | ArmNote T530C |
| ASPEN COMPUTER | Universa P, Universa CD, Aspenta |
| ACER | Acernote Pro |
| BIT COMPUTER | DM ModuleBook |
| COMTRADE | SoundWinNote, Stereo CD Note |
| DELL | Latitude XP1, LX 4100D |
| DIRECT WAVE | CD ThunderNote |
| ERGO | SubBrick 75, Notebrick |
| | PowerBrick, CD Brick |
| EPS TECHNOLOGIES | Pentium-90, Pentium-100 |
| | 486DX4-100, Pentium-75 |
| FUTURE TECH SYSTEMS | FM859, FM959, FM559, FM769, |
| | FM309 |
| HI TECH USA | Multimedia |
| HYPERDATA | Hyperbook P-100A |
| | Hyperbook P-75A |
| | MediaGo 900GT |
| KEYDATA | Commander, Keynote Ultra |
| | Keynote Elite MM |
| MAXIMUS COMPUTERS | SuperNote, PowerMax CD |
| MPC | CD Book, TouchNote |
| MITRA | EZBook road Warrior |
| | EZBook Plus Color |
| PROSTAR | 9400, 9200, 5200 CD, 9600 |
| PROCORP | Sound Notebook |
| SWAN TECHNOLOGIES | SwanNote |
| | SwanNote P90d |
| | SwanNote P90a |
| | SwanNote P75A |
| SAGER | NP8500, NP7500, NP8600, NP9500 |
| WINBOOK | WinBook Xp |
| ZEOS INTERNATIONAL | Meridian 400C, 400A |
| | 800A, 800C, 850C |
| SD TECHNOLOGY | Value |

Thus, while several embodiments have been shown and described, the invention should not be restricted in spirit or scope, except as described in the following claims.

I claim:

1. In a portable computer of the type having a keyboard on a keyboard base section including internal components and a screen on a screen section pivotally attached to the keyboard base section, and a latch for latching the keyboard base section and screen section closed, the improvement comprising:

a keyboard base cover section made of a thin and flexible material and having front and back walls joined by bottom, left and right side walls, and an open top, the keyboard base cover section adapted to slide over the keyboard base section of the computer; and a screen cover section attached to the keyboard cover section and made of a thin and flexible material and having front and rear walls joined by left and right side walls and a top wall, the screen cover section adapted to slide over the screen section, with the front wall of the keyboard base cover section and the front wall of the screen cover section at least partially covering surfaces of the computer surrounding the keyboard and screen, respectively and being thin enough to allow the base keyboard section and the screen section to be pivoted closed and latched, the keyboard base cover section having a plurality of cut-outs, sized and shaped to align with the internal components within the keyboard base section, and a flap over at least some of the cut-outs, with each flap adapted to cover an internal component when closed, and to expose that internal component when the flap is opened.

2. The computer of claim 1 further comprising a padding material attached to an inside surface of the base cover section or upper cover section.

3. The computer of claim 1 wherein the upper cover section is joined to the lower cover section.

4. The computer of claim 1 further comprising hinge tabs extending from the front wall of the upper cover section and adapted to wrap around a lower edge of the upper section.

5. The computer of claim 1 wherein the material is less than 3/16 inch thick.

6. The computer of claim 1 wherein the upper section of the portable computer has a screen, and the upper cover section has a screen cutout opening aligned over the screen.

7. The computer of claim 1 further comprising a transparent window attached to the screen section cover and positioned over the screen.

* * * * *